July 9, 1963     H. R. WEIR     3,096,606
GROUND ENGAGING SUPPORT FOR GROUND TRAVERSING MACHINES
Filed May 12, 1961     3 Sheets-Sheet 1

INVENTOR
HUGH R. WEIR
BY
Williamson, Schroeder & Palmatier
ATTORNEYS

July 9, 1963 H. R. WEIR 3,096,606
GROUND ENGAGING SUPPORT FOR GROUND TRAVERSING MACHINES
Filed May 12, 1961 3 Sheets-Sheet 2
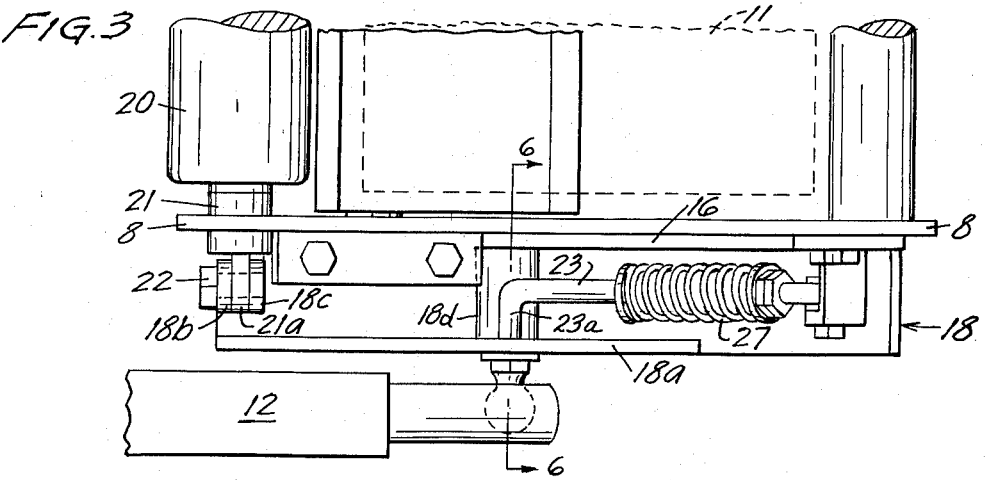
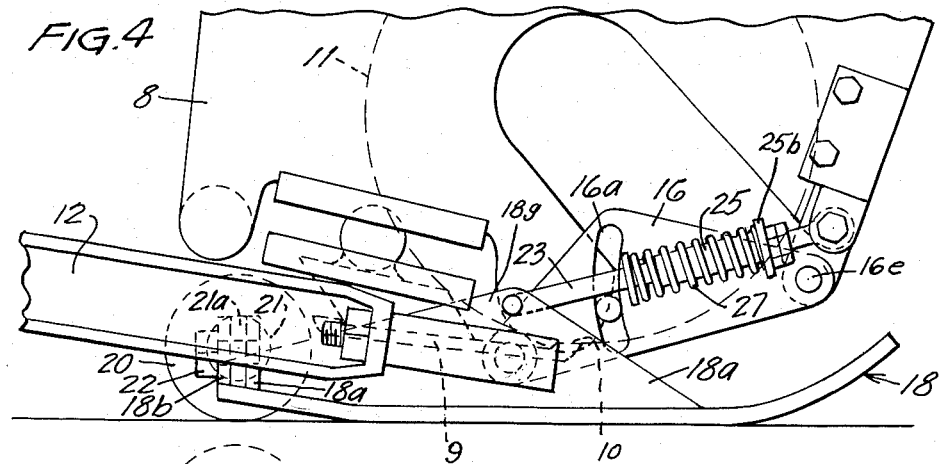
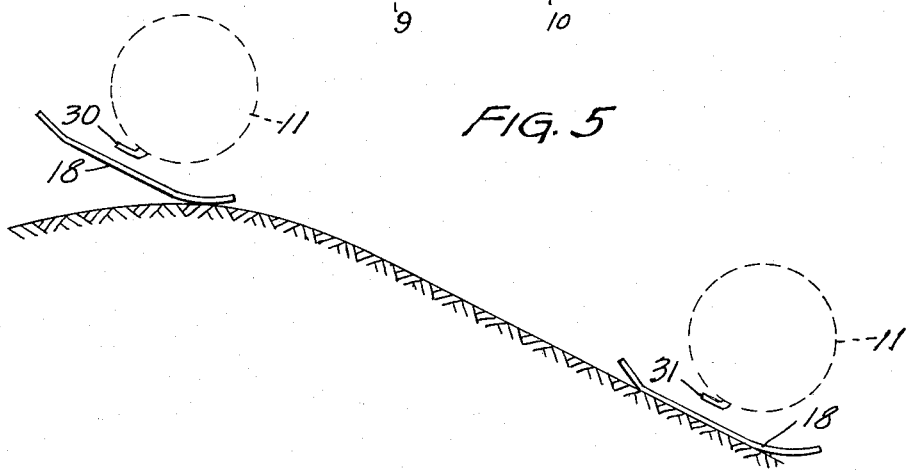
INVENTOR
HUGH R. WEIR
BY
Williamson Schroeder Palmatier
ATTORNEYS July 9, 1963 H. R. WEIR 3,096,606
GROUND ENGAGING SUPPORT FOR GROUND TRAVERSING MACHINES
Filed May 12, 1961 3 Sheets-Sheet 3

INVENTOR
HUGH R. WEIR
BY
Williamson & Palmatier
ATTORNEYS ated July 9, 1963

3,096,606
GROUND ENGAGING SUPPORT FOR GROUND TRAVERSING MACHINES

Hugh R. Weir, Minneapolis, Minn., assignor to Toro Manufacturing Corporation, Minneapolis, Minn., a corporation of Minnesota
Filed May 12, 1961, Ser. No. 112,159
9 Claims. (Cl. 56—26)

This invention relates to ground engaging supports for ground traversing machines and is a continuation in part of my application entitled Ground Engaging Support for Ground Traversing Machines, Serial No. 821,912, filed June 22, 1959, now abandoned.

More particularly, it relates to ground engaging supports for ground traversing machines such as grass mowers and especially for grass mowers of the multiple unit type wherein some of the units trail others.

One of the more serious problems encountered in producing mower units which will perform satisfactorily in accordance with the demands of the trade has been the difficulty in providing a machine which will yield a uniform cut even though the machine is operated at relatively high speeds and/or comprised of a number of cutting units. When a mowing unit is drawn at a comparatively high speed and a bump, rock, or other obstruction, is encountered by the cutting unit, the conventional unit tends to bounce for a considerable distance and as a result provides an irregular cut. Moreover, the resiliency of the material from which the mowing unit is made normally causes the cutting unit to be elevated a substantial distance above the elevation of the stone or obstruction encountered so that the difference in the cut which would result at a lower rate of speed will be amplified because of the higher rate of speed of the unit. Such speeds have been found to be required however, in order to make mowing units practical for large areas and therefore it is imperative that some means be provided, if possible, for diminishing or eliminating such bouncing tendencies.

It is well known that the vertical displacement of such a unit can be dampened through the use of a shoe to support the unit but in providing a shoe additional problems are encountered. For example, if shoes are provided at each side of such a unit and are fixedly secured to the frame of the unit, these shoes will aid in dampening the adverse effects in that the shoe, in encountering an obstruction will lengthen the period of oscillation so that the change in cut elevation is more gradual and will tend to absorb the shock to the unit and hence dampen the bouncing tendency. If the stone or obstruction misses the shoe, however, and is encountered by the roller extending between the shoes, the undesirable bouncing effect is still obtained so that a shoe of the conventional type fails to adequately solve the problem. In addition, in such a construction the weight of the unit is supported by the shoe with the result that many adverse effects such as scuffing, and other damage to the grass surface results from the movement of the shoe during turning maneuvers and in ordinary traversing of the grass surface. Such a shoe makes it difficult to turn and does considerable damage to the grass surface during the turning operation.

In addition to the above, the use of shoes has been unsatisfactory in multiple unit mowing machines wherein some of the cutting units are disposed ahead of others. This is true because such units have been conventionally connected to the frame of the machine by parallelogram connections or by other means so that the attitude of the more rearward units changes with the attitude of the forward units in going over the crest of a hill, for example. In other words, the attitudes of the cutting units are all the same and this results in an uneven cut when the contour of the surface being mowed is irregular as when going over the crest of the hill, for the forward unit will cut the grass immediately prior to reaching the crest of the hill at the desired elevation but once it passes over the crest, the attitudes thereof and the attitude of the trailing units all change. When shoes are used on such units, this places the weight of the trailing units on the forward part of the shoe and causes the rear end of the shoe to be elevated, thereby elevating the cutting edge of the bed bar of the mowing unit with the result that the lateral units will cut the grass at a higher elevation than did the forward unit as it passed the area immediately preceding the same crest line. Such variations in elevation of cut are highly undesirable in that they present an unsightly appearance. My invention is designed to eliminate many of the above objections and to substantially diminish others.

It is a general object of my invention to provide a novel and improved ground engaging support for ground traversing machines which is simple and inexpensive in construction and operation.

A more specific object is to provide a ground engaging support for ground traversing machines simple and inexpensive in construction and designed to effectively diminish the adverse effects of an obstruction encountered by such a machine and to dampen the amplitude of undesired vertical movement normally resulting from such an encounter.

Another object is to provide an improved ground engaging support for ground traversing machines such as mowers which will lengthen the period of oscillation if an obstruction is encountered by the support without having other undesirable features inherent in the construction which tend to diminish or obviate the value of the advantage obtained.

Another object is to provide a ground engaging support for ground traversing machines such as multiple lawn mowing units which will enable the more rearward units to maintain the same attitude as the forward units while passing over the crest of a hill.

Another object is to provide a ground engaging support for ground traversing machines which will greatly facilitate turning of such machines and reduce the adverse effects of scuffing and sliding by the ground engaging support while at the same time lengthening the period of oscillation if an obstruction is encountered thereby.

Another object is to provide a novel ground engaging support for ground traversing machines such as lawn mowing units which will effectively dampen the vertical distance through which the machine must move as a result of encountering an obstruction by the support, all without including adverse effects of scuffing etc., normally attendant to such ground engaging supports.

Another object is to provide a ground engaging support for ground traversing machines such as mowing machines constructed and arranged to permit one side of the machine to be elevated as a result of the support encountering an obstruction, without requiring the opposite side thereof to be similarly elevated.

Another object is to provide a novel and improved ground engaging support for ground traversing machines such as mowing machines which will provide the same elevation of the bed knife of the mowing unit regardless of the attitude of the cutting unit.

Another object is to provide a ground engaging support for ground traversing machines such as mowing machines which will effectively distribute the weight of the machine in a most desirable manner so as to cause the least adverse effects upon the grass surface being mowed when the machine traverses the same.

These and other objects and advantages of my invention will more fully appear from the following description, made in connection with the accompanying drawings, wherein like reference characters refer to the same or similar parts throughout the several views, and in which:

FIG. 3 is a plan view of a part of the ground engaging support for the mowing assembly shown in FIGS. 1 and 2 on an enlarged scale to better illustrate the invention;

FIG. 4 is a fragmentary side elevational view of the structure shown in FIG. 1 and on the same scale as that of FIG. 3; and FIG. 5 is a diagrammatic view illustrating the adverse features of a fixed shoe which are overcome by the invention set forth herein;

Figure 1:
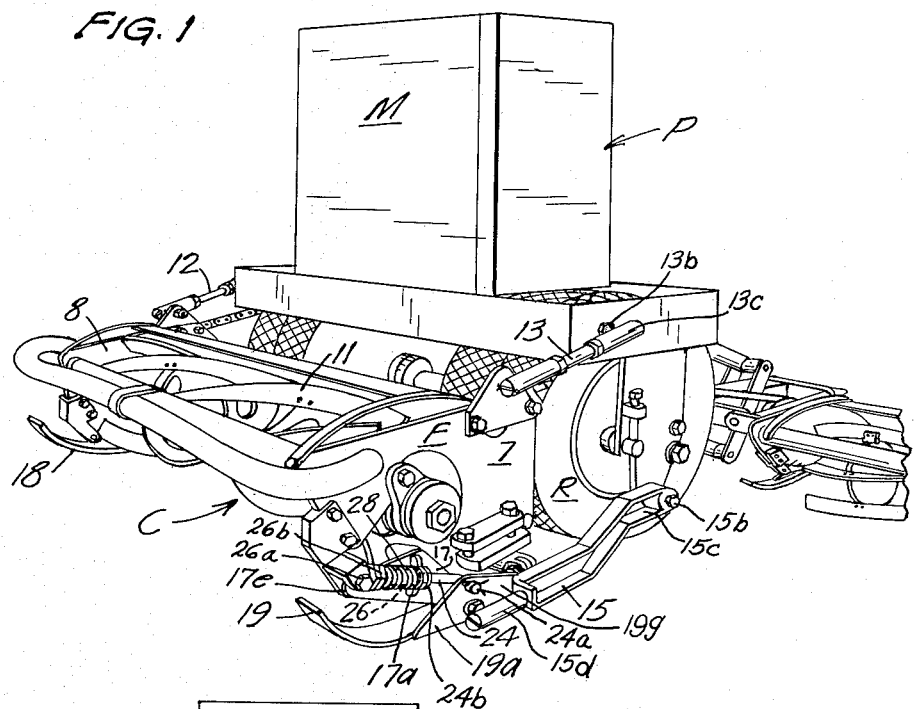
FIG. 1 is a perspective view of part of a mowing assembly having multiple cutting units and utilizing my invention and power driven ground engaging propelling means for causing the assembly to traverse the ground.

FIGS. 1 to 7 illustrate the invention claimed herein and used in combination with a ground traversing machine such as a multiple cutting-unit lawn mower which conventionally is provided with a ground engaging support of one type or other. FIG. 1 shows one of such cutting units completely and a portion of another. As shown, the assembly includes a frame indicated generally by the letter F which is propelled across the ground by a power driven propelling means indicated generally by the letter P, the latter including a motor M and a drive roller R which functions to push the cutting unit disposed directly thereahead forwardly across the ground and, by linkage, to draw or push the additional cutting units included in the assembly across the ground and in trailing and laterally disposed positions.

The frame F, as shown, includes a pair of side plates 7 and 8 which has the cutting mechanism of the mowing unit mounted thereon. This cutting mechanism, indicated generally by the letter C, includes a bed bar 9 having a cutting edge 10 to cooperate with the reel 11.

Figure 2:
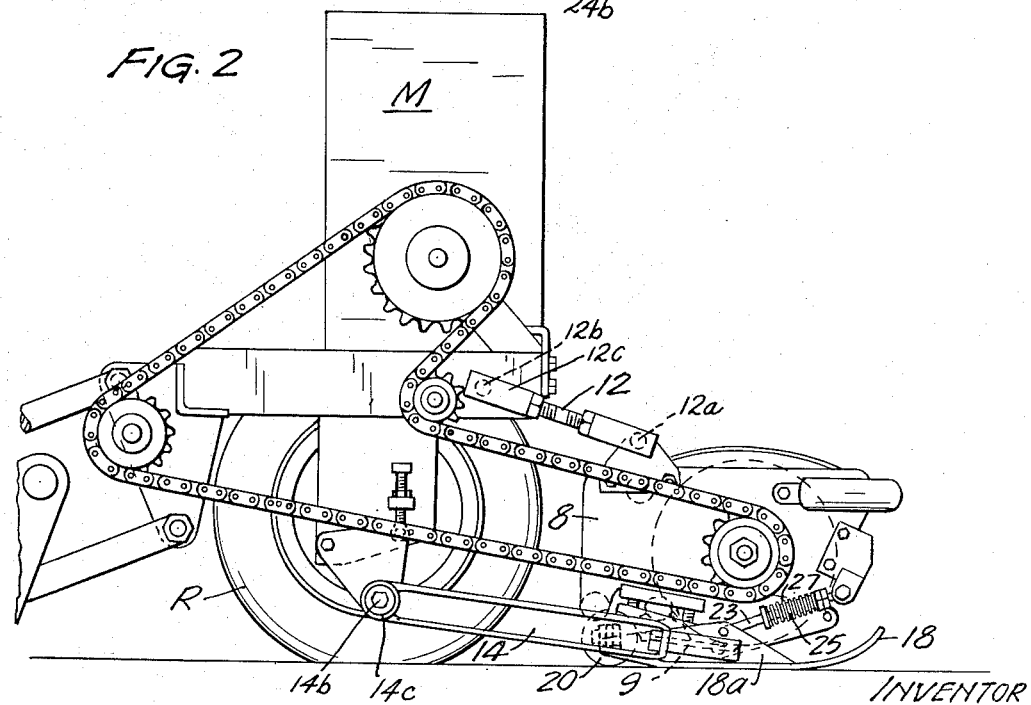
FIG. 2 is a side elevational view of the same.

The cutting mechanism C and frame F are pushed across the ground by means of a plurality of push-arms which are mounted upon the propelling means P. A pair of such arms 12 and 13 are each pivotally mounted at their rear ends 12c and 13c respectively upon the propelling means by means of a ball and socket joint and each are connected by means of similar ball and joints to the upper portion of one of the side plates 7 and 8 as best shown in FIG. 1. The ball and socket connection between push-arm 12 and side plate 8 is indicated at 12a in FIG. 2 while the ball and socket between push-arm 12 and propelling means P is indicated by the reference numeral 12b. A ball and socket connection between the push arm 13 and the propelling means P has been indicated by the reference numeral 13b, in FIG. 1, while the similar ball and socket joint (not shown) connect the arm 13 and the plate 7. A pair of push-arms 14 and 15 are pivotally mounted at their rear end portions 14c and 15c respectively as best seen in FIGS. 1 and 2, upon the propelling means P and are also pivotally connected at their forward end portions 14d and 15d respectively to the cutting unit C as will hereinafter be described. It will be noted that the pivot connection of the push-arm 14 with the propelling means P, is indicated by the reference numeral 14b, while a pivot connection between the push-arm 15 and the propelling means P, is indicated by the reference numeral 15b.

Figure 6:
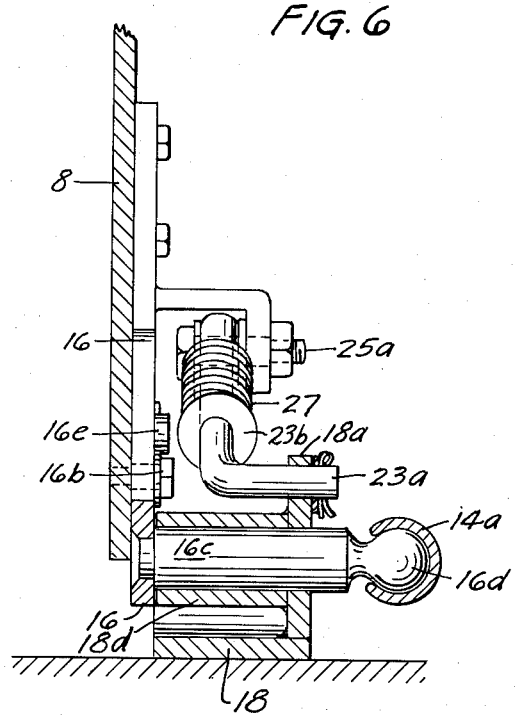
FIG. 6 is a cross sectional view taken approximately along line 6—6 of FIG. 3 and looking in the direction of the arrows.
Figure 7:
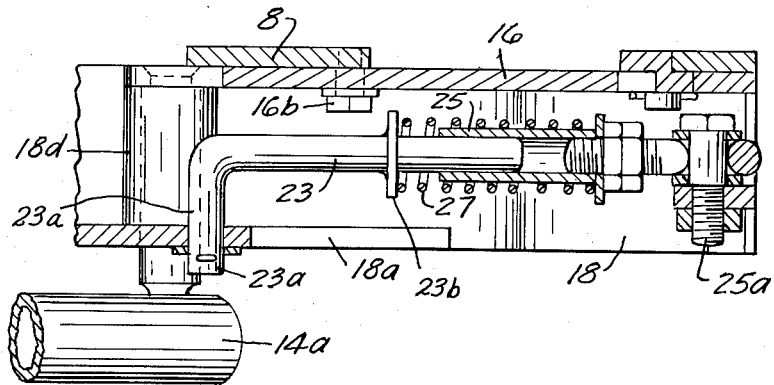
FIG. 7 is a longitudinal detailed fragmentary sectional view on an enlarged scale of one shoe and mounting means therefor.

Pivotally mounted upon each of the side plates 7 and 8 is one of a pair of height adjustment links 16 and 17. As best shown in FIG. 1 and 4, these height adjustment links pivot at their forward end portions and can be swung thereabout within the limits of slots formed within the links such as 16a and 17a. Means is provided for selectively adjusting these links to various elevations and locking them in such position in a manner well known and conventional in the art. This adjusting means includes, for link 16, a bolt 16b which extends through slot 16a and through a corresponding aperture in side plate 8 and is secured to the plate by means of a nut (not shown). Link 17 has a similar adjusting bolt and nut assembly to that of link 16 although this nut and bolt is not shown in the drawings. It will be noted that link 16 is pivotally connected at its forwardmost end to side plate 8 by means of a pivot connection 16e and that link 17 is pivotally connected to side plate 7 by means of pivot connection 17e. Pivotally mounted upon each of the heighth adjustment links 16 and 17 at the respective rearward ends of the latter is one of a pair of elongate shoes 18 and 19. As clearly shown, each of these shoes has an upstanding mounting bracket member such as 18a and 19a by means of which the shoe is pivotally mounted upon its supporting heighth adjustment link. It will be noted that each of the shoes 18 and 19 is pivotally mounted upon its supporting heighth adjustment link at points substantially opposite a cutting edge 10 of the bed bar 9. Referring now to FIG. 6, it will be seen that shoe 18 is provided with a bearing sleeve 18d which is integrally formed with bracket member 18b and extends laterally rearwardly therefrom. Link 16 has a pivot pin 16c extending laterally therefrom and through bearing 18d. Actually, pivot pin 16c is fixedly connected with link 16. It will be noted that pivot pin 16c has a ball 16d at its outer end as best seen in FIG. 6, and this ball is received within the socket 14a of the push-arm 14. Thus, it will be seen that shoe 18 and push-arm 14 have a common pivot. Shoe 19 is also pivotally connected to its associated link 17 and push-arm 15 in a manner substantially identical to that of link 16 with its associated shoe and push-arm, although such pivotal connections of link 17 are not shown in the drawings. It is felt that the description and illustration for one side is sufficient since the supporting arm, link, and shoe for the other side (link 17, push-arm 15 and shoe 19) will be connected as pointed out, in substantially identical fashion. Since the push-arms 14 and 15 are pivotally connected to shoes 18 and 19 respectively at the same axis of pivot which the shoes 18 and 19 pivot upon their supporting heighth adjustment links 16 and 17 respectively, the axis of pivot of the shoes 18 and 19 is in substantially the same vertical plane as the cutting edge 10 of the bed bar 9 so that regardless of the heights at which the cutting unit is set by means of heighth adjustment links 16 and 17, the axis of pivot shoes 18 and 19 will be in substantially the same vertical plane as the cutting edge 10.

Referring now to FIG. 3, it will be seen that an elongate roller is pivotally mounted for rotation about its longitudinal axis between the rear end portions of the shoes 18 and 19. This roller 20 is also mounted in such a manner that the ends thereof pivot about an axis extending parallel to the direction in which a machine will traverse the ground. Opposite ends of the roller 20 are reduced and these opposite ends are received within suitable bearing members to permit rotation of the roller 20 about its longitudinal axis. Although only one end of the roller 20 and the pivotal connections thereof with one of the shoes is illustrated in FIG. 3, it is felt that the description and illustration of the coupling connection at this one end of the roller will suffice for the purposes of the present invention since the other end of the roller is also mounted in the identical manner. Referring now to FIG. 3, it will be seen that the reduced end of the roller 20 is received within a bearing member 21 so that the roller may revolve about its longitudinal axis and it will also be noted that the bearing member 21 is provided with an outwardly extending ear 21a. Each of the shoes 18 and 19 are provided with a pair of upstanding ears and the ears for shoe 18 are 18b and 18c which receive the ear 21a therebetween and pivotally connected thereto by means of a pivot pin 22 which extends parallel to the direction in which the ground will be traversed by the machine and parallel to the longitudinal axis of the shoes. Thus, it will be seen that the roller 20 is mounted for rotation about its longitudinal axis and is also mounted at each end for pivotal movement relative to the shoes about axes extending parallel to the longitudinal axis of the shoes. It is this latter connection which provides a pivotal movement for the roller about an axis parallel to the direction in which the machine traverses the ground.

Pivotally connected to the respective upper portions 18g and 19g of each of the upstanding brackets 18a and 19a of the shoes 18 and 19 respectively as best seen in FIGS. 1, 3, 4 and 6 is a resiliently urged rod which constantly urges the rear end portions of the shoes downwardly. Referring to FIG. 1 it will be seen that rod 24 has an offset rear end portion 24a which extends through a suitable aperture in the upstanding bracket 19a of shoe 19, this rear end portion 24a being secured in place by a suitable cotter pin or the like. Thus, it will be seen that the offset end 24a defines a pivot connection between the shoe bracket portion 19a and the rod 24. It will also be noted that rod 23 has an offset rear end portion 23a, as best seen in FIG. 6, which extends through a suitable aperture in the upstanding bracket portion 18a of shoe 18 to define a pivot connection between the rod 23 and the bracket portion 18a. Referring again to FIGS. 1 and 4, it will be seen that each of the rods 23 and 24 are telescopically received within the sleeves 25 and 26 respectively. The sleeve 25 has its forwardmost end pivotally connected with side plate 8 by means of a pivot connection 25a, as best seen in FIG. 6, and it will be seen that sleeve 26 is pivotally connected to side plate 7 as best seen in FIG. 1 by means of pivot connection 26a. Sleeve 25 is provided with an annular collar 25b and sleeve 26 is provided with an annular collar 26b. It will also be noted that rod 23 is provided with a collar 23b rigidly affixed thereto and rod 24 has a collar 24b rigidly affixed thereto. Sleeves 25 and 26 are respectively surrounded by coil springs 27 and 28, spring 28 having opposite ends thereof bearing against collar 24b and collar 26b while spring 27 has opposite ends thereof which bear against collars 23b and 25b. Thus, it will be seen that springs 27 and 28 respectively urge the rods 23 or 24 as the case may be, rearwardly so as to urge the shoes to pivot about their respective axes of pivot whereby the rear end portions of the shoes will tend to move downwardly. The rods 23 and 24 are constantly urged rearwardly since the forwardmost ends of the rods are telescopically received within the sleeves 25 and 26 respectively, the sleeves being pivotally connected to the plates so that forward movement of the sleeve is prevented. Therefore, the action of springs 27 and 28 constantly urges the rear portions of the shoes downwardly. Since the roller 20 is constantly urged downwardly, the result of such action is that the major portion of the weight of the cutting unit C and the frame F is constantly borne by the roller. The springs 27 and 28 are adjusted so that only a small portion of the weight of the cutting unit and frame F is borne by the intermediate and forward portions of the shoes 18 and 19, while the major portion of the weight of the unit is borne by the roller 20.

When a ground traversing machine is supported by ground engaging supports such as the shoes 18 and 19 mounted in the manner specified herein, the weight of the cutting units is borne almost entirely by the roller 20. It will be readily appreciated that since most of the weight of the unit is upon the roller 20, this will substantially reduce the tendency towards scuffing and damaging of the grass surface during the turning movements. This has been one of the chief objections to the use of shoes on lawn mowing units for it has been found that during turning movements, serious damage results to the grass surface as a result of scuffing. This is accentuated because of the weight of the machine being borne by the forward parts of such shoes. With my construction, most of the weight is borne by roller 20 and hence the tendency towards scuffing is substantially eliminated.

It will be readily appreciated that the functions of the shoes 18 and 19, when an obstruction such as a rock is engaged thereby, will be to lengthen the period of the cutting unit oscillation resulting from such an obstruction. This causes the change in the cut height to be gradual. This function however, is obtainable from a fixed shoe and therefore does not constitute in and of itself an improvement. The particular mounting of my shoe however, does in addition to lengthening the period of oscillation, reduce the amplitude of the cutting unit oscillation, in that the tendency to bounce is eliminated by substantially all of the weight being borne by the roller 20. For example, if a stone or other obstruction happens to pass between the shoes 18 and 19 and is engaged by the roller 20 the bouncing which would otherwise result from such an obstruction is almost completely eliminated by the resilient mounting of the roller 20. Thus, a much more even cut is provided as a result of this resilient mounting. Furthermore, the cutting unit will not rise to the extent that it would if the shoe were rigidly mounted. In other words, the resiliency of the material from which the cutting unit is made and supported is dampened by the resilient mounting of the shoes so that when such an obstruction is encountered, the entire cutting unit will not rise to the extent that it would not have been thrown with a fixed mounting of the shoes. Such a mounting as I have disclosed and claimed herein, eliminates bobbing and the consequent series of transverse ridges of uncut grass which normally results from the use of shoes fixedly mounted on the cutting unit, especially when the units are moved at relatively high speeds.

It will be noted that with my unique mounting the change in attitude of the cutting units is of no serious consequence, regardless of the nature of the terrain over which the various units are passing. The unique mountings of my shoes provide the same elevation of the bed knife regardless of the attitude of the cutting unit, for as my cutting unit passes over an area which with the normal type of mounting would cause the bed knife to be elevated, the bed knife remains at substantially the same elevation because the resilient mounting of the rollers permits the forward ends of the shoes to elevate. This can best be seen by reference to FIG. 5 wherein it is shown that with a fixed shoe the bed knife indicated by the numeral 30 would be elevated substantially as compared to the elevation of the bed knife 31 when the latter passed the same point. When the bed knife of the more forward unit shown in FIG. 5, passed the position of the cutting unit shown at the left hand side of that view, the elevation thereof was substantially the same as that shown in the right hand side of FIG. 5. When the trailing unit reaches this point however, a fixed shoe as shown in FIG. 5 will cause the bed knife 30 to be elevated substantially because substantially all of the weight will be borne by the forward part of the shoe as shown and the rear end of the shoe will be elevated, thereby raising or elevating the bed knife 30. This undesirable feature is substantially eliminated through the use of my unique mounting for the shoes and as a result, a much more satisfactory and even cut can be attained.

It will be noted that each of my shoes 18 and 19 has ground engaging portions which are flat. This gives maximum weight distribution over the shoe so that the relatively small portion of the cutting unit which is borne by the intermediate and forward parts of the shoe is evenly distributed and can cause little damage during turning movements or other movements across the ground.

The illustration of FIG. 5 shows the effect of passing over the crest of a small hill when a plurality of the cutting units are arranged in trailing relation and are connected as is convention, so that the attitude of one unit is always the same as the attitude of the other. It will be noted that the trailing units in passing over the crest as shown in FIG. 5 have the same attitude as the forward units, but that this attitude is different from the attitude which the forward unit had as it passed the same point. In other words, the attitude of the trailing unit is different from the attitude of the more forward unit as it passed the crest of the hill and therefore a very uneven cut results. Such disadvantages are eliminated through the use of my ground engaging support.

It should also be noted that the roller 20 is mounted in such a manner that one end thereof may be elevated while passing over a stone or other obstruction while the other end thereof remains in close proximity or in contact with the ground. Such action is permitted by the pivotal movement and mounting of the roller 20 for movement about an axis extending parallel to the longitudinal axis of the shoes and parallel to the direction in which the machine traverses the ground. Under such an arrangement the outer end of a roller in a multiple cutting unit can be elevated while the inner end remains at a lower elevation and thereby the adverse effects of engaging an obstruction such as a stone is substantially reduced.

In view of the above it can be readily seen that I have provided a novel, simple and inexpensive ground engaging support for ground traversing machines which provides a number of distinct advantages. My ground engaging support substantially dampens the amplitude of undesirable vertical movement normally resulting from encountering an obstruction and also lengthens the period of oscillation caused by encountering such an obstruction so that the difference in elevation of cut becomes less noticeable. This lengthening of the period of oscillation is accomplished without retaining the other undesirable features which have heretofore been inherent in a fixed mounting. It can also be readily seen that my ground engaging support substantially eliminates the adverse effect of connections between such multiple cutting units which require that the attitudes of the machines be the same. For example, in going over the crest of the hill, the requirement that the attitudes of the cutting units be the same is offset by the fact that the forward portion of the shoe readily moves upwardly and thus permits the cutting edge 10 of the bed bar 9 to remain at the same elevation as that at which it was disposed immediately therebefore in that the springs urge the rollers downwardly and bear substantially all of the weight of the cutting unit. Thus, the tendency to elevate the bed bar which would be caused by the change in attitude of the cutting unit is offset by the pivotal movement of the shoes.

It will, of course, be understood that various changes may be made in the form, details, arrangement and proportions of the parts without departing from the scope of my invention which consists of the matter shown and described herein and set forth in the appended claims.

What is claimed is:

1. A ground engaging support for ground traversing machines comprising, a frame adapted to be connected to such a machine in supporting relation,
a pair of laterally spaced apart elongate shoes mounted at opposite sides of the frame to engage the ground and at least partially support said frame thereabove,
means pivotally connecting the intermediate portions of each shoe to its associated side of the frame for permitting pivotal movement of the shoes about an axis extending transversely of the machine and orienting said shoes to extend longitudinally in the direction of movement of the machine,
a ground engaging roller extending between said shoes, means interconnecting opposite ends of the roller with the rear end portions of said shoes to permit revolving movement of the roller about its longitudinal axis,
said last-mentioned interconnecting means also defining a pivotal connection between each shoe and one end of said roller to permit relative pivotal movement of the roller with respect to each shoe about a horizontal axis extending substantially parallel to the longitudinal axis of the shoe,
and resilient means interconnecting said frame and said roller and urging said roller downwardly to thereby cause the major portion of the weight of said frame and machine to be borne by the roller.

2. Grass cutting apparatus comprising a frame having forward and rear portions, grass cutting mechanism mounted on said frame and including a bed bar having a cutting edge extending transversely of said frame, a pair of laterally spaced shoes extending longitudinally of and being pivotally mounted on opposite sides of said frame at points opposite the cutting edge of said grass cutting mechanism for pivotal movement about an axis extending along said bed bar cutting edge, said shoes engaging the ground in at least partially supporting relation and having forward and rear end portions, a ground engaging roller extending between said shoes, means interconnecting opposite ends of said roller with the rear portions of said shoes to permit rotation of said roller about its longitudinal axis, and resilient means connected with said frame and said roller and urging said roller downwardly to thereby cause the major portion of the weight of said frame and said grass cutting mechanism to be borne by said roller.

3. The structure defined in claim 2 wherein said interconnecting means between each shoe with one end of said roller also defines a pivot connection to permit relative pivotal movement between said roller and each shoe about a horizontal axis extending parallel to the longitudinal axis of said shoes.

4. Grass cutting apparatus comprising a frame having forward and rear portions and including side plates at each side thereof, grass cutting mechanism mounted on said frame between said side plates and including a bed bar having a cutting edge extending transversely of said frame, said bed bar being mounted on said side plates and extending therebetween, a pair of height adjustment links each of which is pivotally mounted on one of said side plates for pivotal movement about a horizontal transverse axis, means for selectively adjusting said height adjusting links about their axes of pivot relative to their pivotally connected side plates, a pair of shoes each of which is pivotally mounted on one of said height adjustment links for pivotal movement about an axis extending transversely of said frame, said shoes having forward and rear end portions and being pivotally mounted by their intermediate portions in position to engage the ground and at least partially support said frame and grass cutting mechanism thereabove, a ground engaging roller extending between said shoes, means interconnecting opposite ends of said roller to the rear portions of said shoes for rotation about its longitudinal axis, and resilient means connected with said side plates and said roller and urging said roller downwardly to thereby cause the major portion of the weight of said frame and grass cutting mechanism borne to be supported by said roller.

5. The structure defined in claim 4 wherein the axis of pivot of said shoes are in the same general vertical plane as the cutting edge of said bed bar.

6. The structure defined in claim 4 wherein said means interconnecting each shoe with one end of said roller also defines a pivotal connection for relative pivotal movement between each shoe and said roller about a horizontal axis extending parallel to the longitudinal axis of said shoes.

7. The structure defined in claim 4 wherein said shoes and said roller constitute the sole means for supporting said frame and said grass cutting mechanism.

8. The structure defined in claim 4 wherein a minor part of the weight of said frame and said grass cutting mechanism is supported by the end portions of said shoes opposite to the end portions thereof upon which said roller is mounted.

9. Grass cutting apparatus comprising a frame having forward and rear portions and including side plates at each side thereof, grass cutting mechanism mounted on said frame between said side plates and including a bed bar having a cutting edge extending transversely of said frame, said bed bar being mounted on said side plates and extending therebetween, a pair of height adjustment links each of which is pivotally mounted on one of said side plates, means for selectively adjusting said height adjusting links about their axes of pivot relative to their pivotally connected side plates, a pair of shoes each of which is pivotally mounted on one of said height adjustment links for pivotal movement about an axis extending transversely of said frame, said shoes having forward and rear end portions and being pivotally mounted by their intermediate portions in position to engage the ground and at least partially support said frame and grass cutting mechanism thereabove, a ground engaging roller extending between said shoes, means interconnecting opposite ends of the roller with the rear end portions of said shoes to permit revolving movement of the roller about its longitudinal axis, said interconnecting means also defining a pivotal connection between each shoe and one end of said roller to permit relative pivotal movement with respect to each of said shoes about a horizontal axis extending substantially parallel to the longitudinal axis of the shoes, resilient means connected to said side plates and said roller and urging said roller downwardly to thereby cause the major portion of the weight of said frame and grass cutting mechanism to be supported by said roller, power-driven ground-engaging propelling means, a pair of push arms one each of which is pivotally connected at one of its ends to upper portions of one of said side plates and is also pivotally connected at an opposite end thereof to said propelling means, and a second pair of push arms one each of which is pivotally connected at one of its end portions to said propelling means and is also pivotally connected at its opposite end portions to one of said shoes at the axis of pivot of said shoe upon its supporting height adjustment link.

References Cited in the file of this patent

UNITED STATES PATENTS

| | | |
|---|---|---|
| 2,032,784 | Worthington | Mar. 3, 1936 |
| 2,335,054 | Godwin | Nov. 23, 1943 |
| 2,507,423 | Schweizer | May 9, 1950 |
| 2,620,613 | Bradley | Dec. 9, 1952 |
| 2,674,837 | Buck | Apr. 13, 1954 |
| 2,705,861 | Mott | Apr. 12, 1955 |